United States Patent Office 3,473,174
Patented Oct. 21, 1969

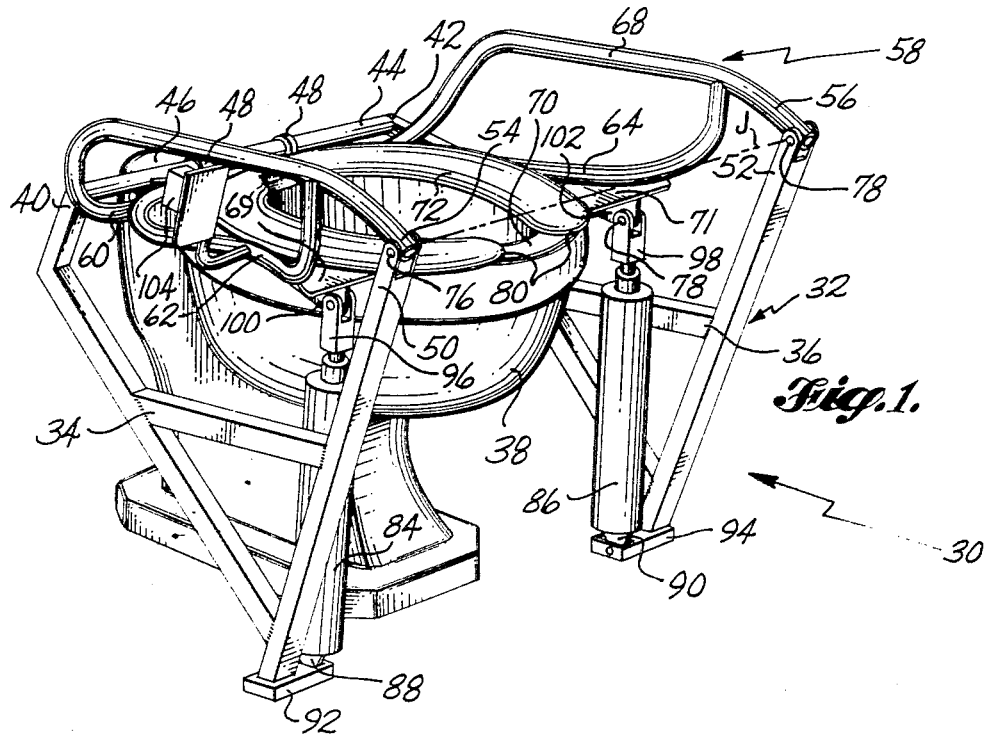
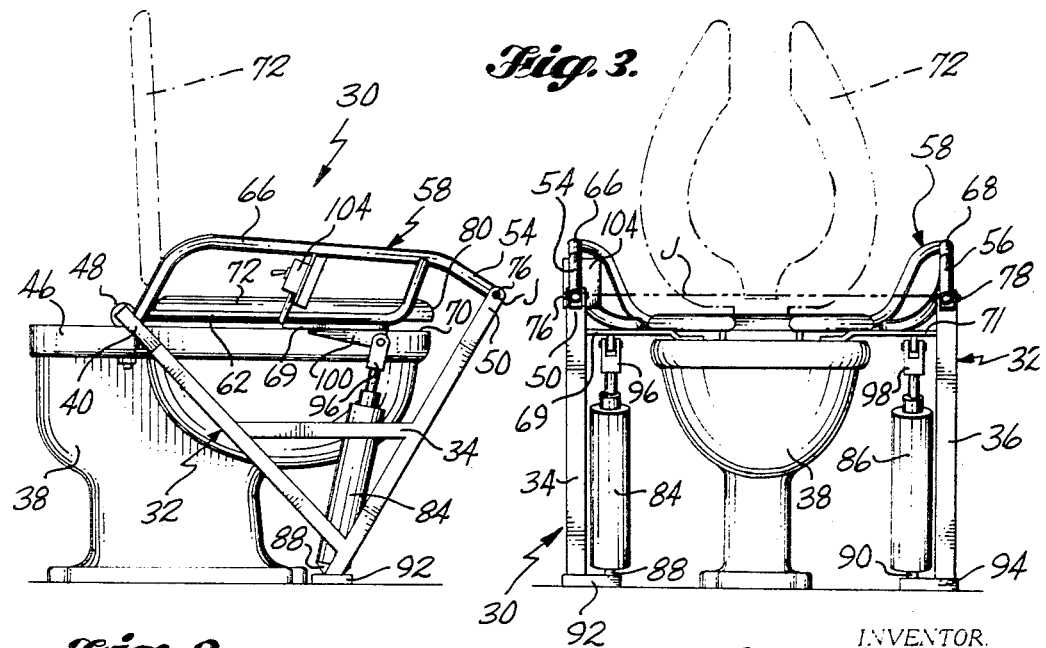

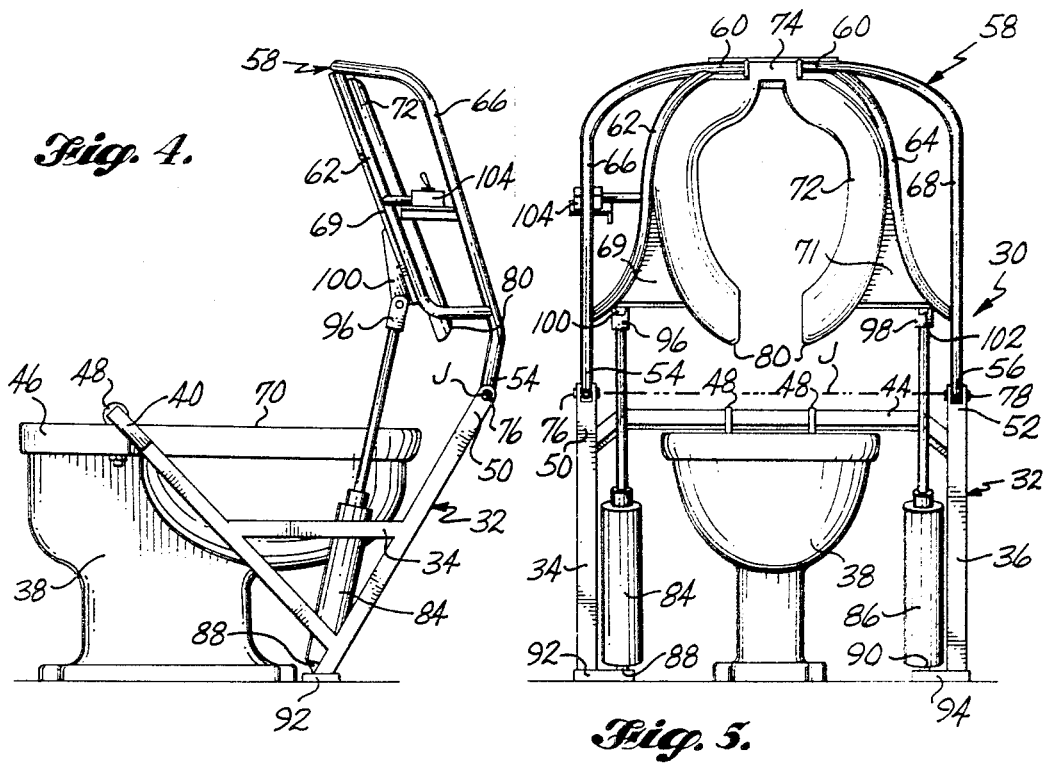

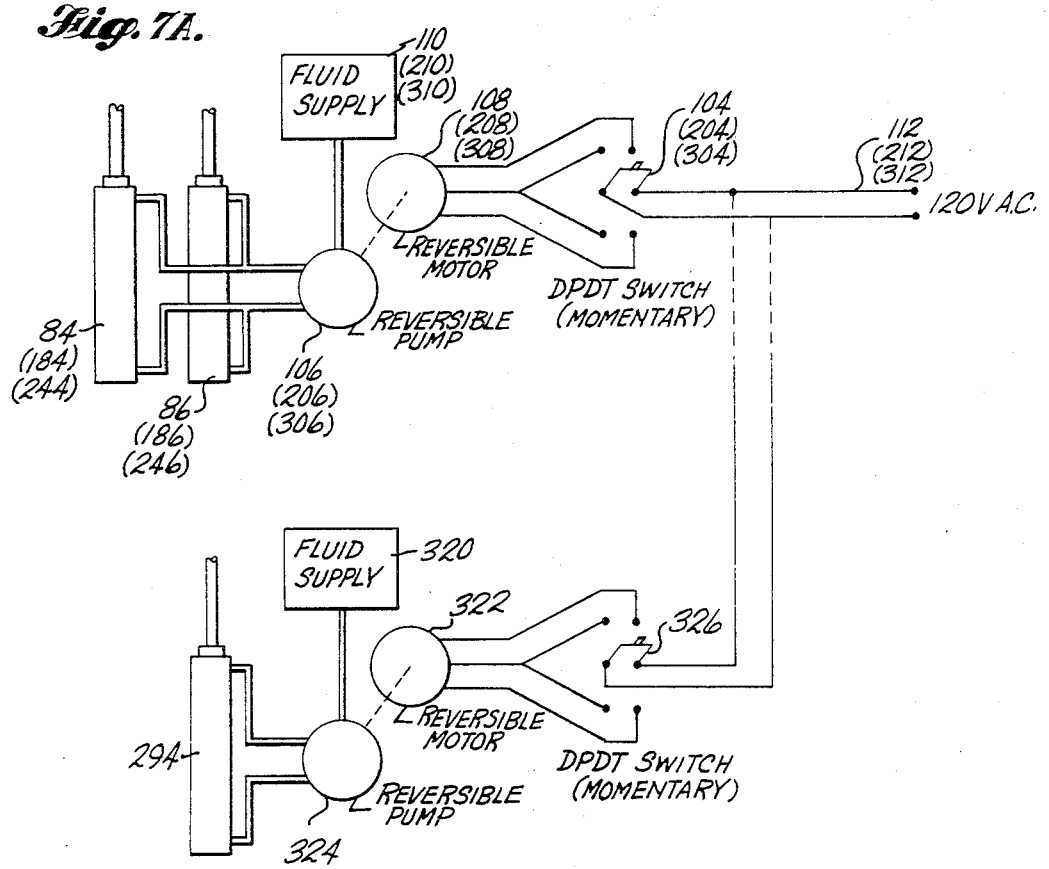

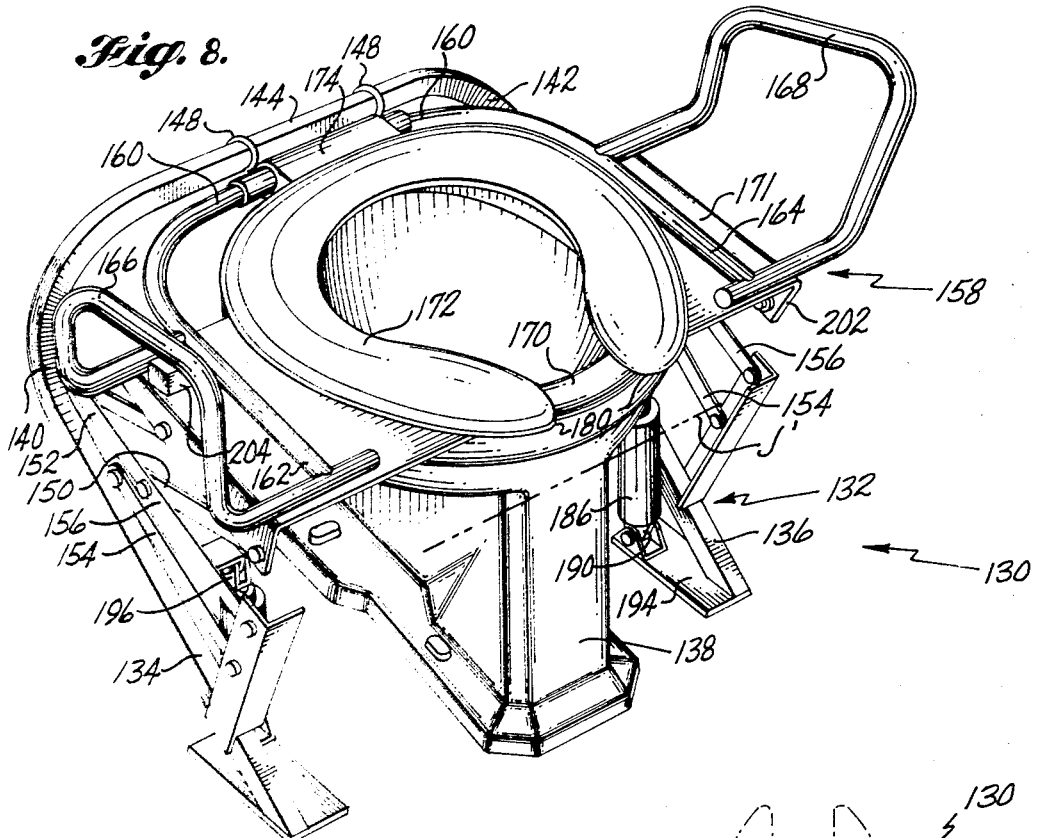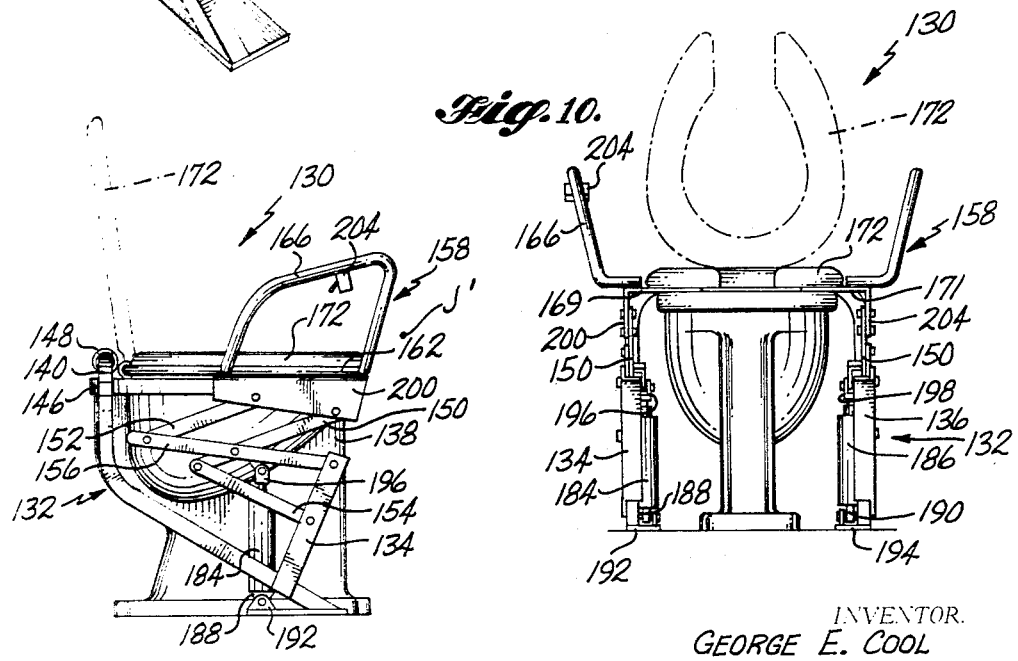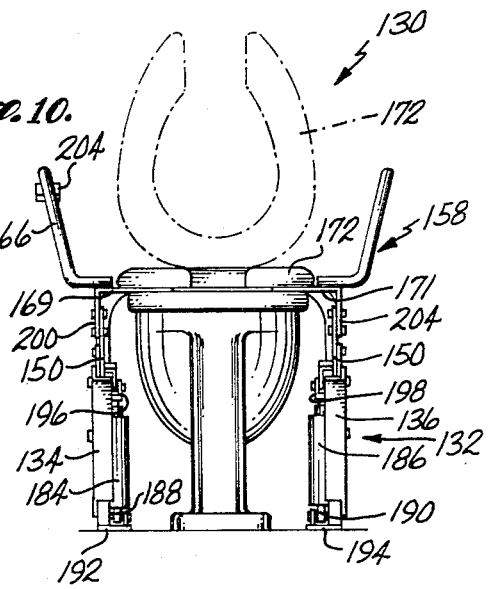

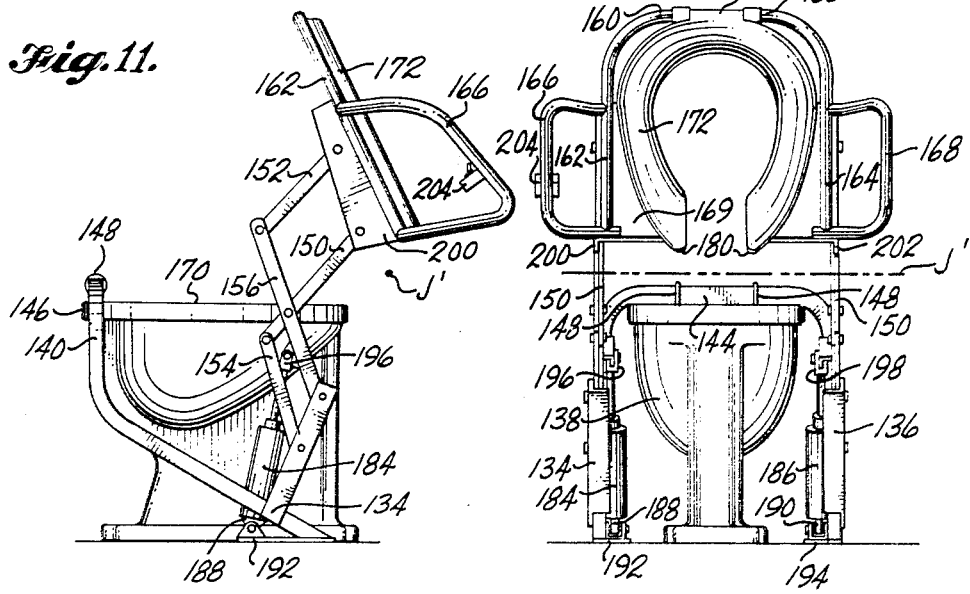

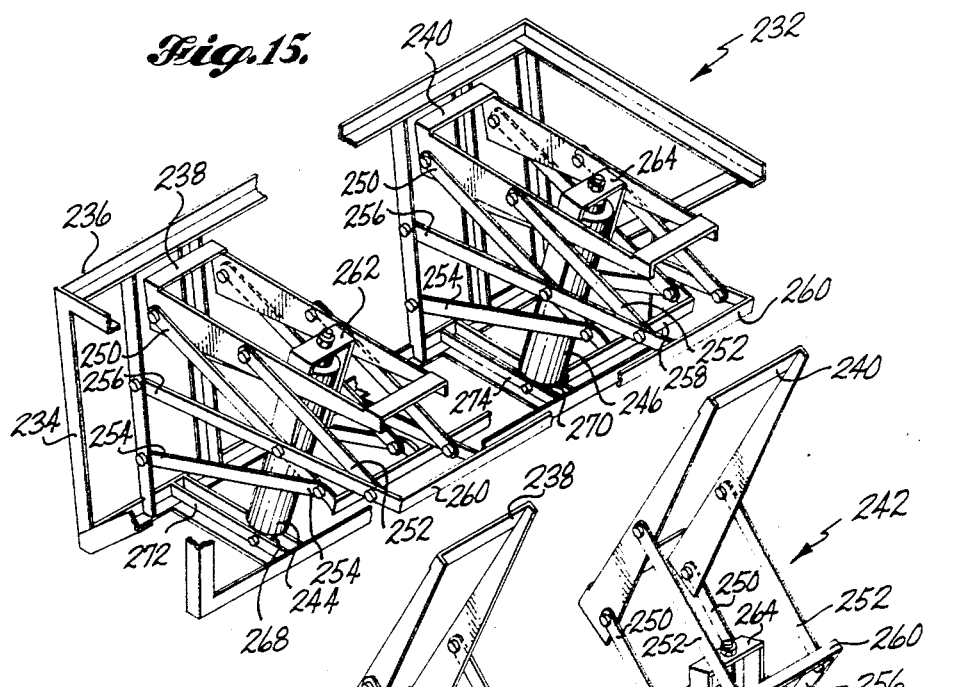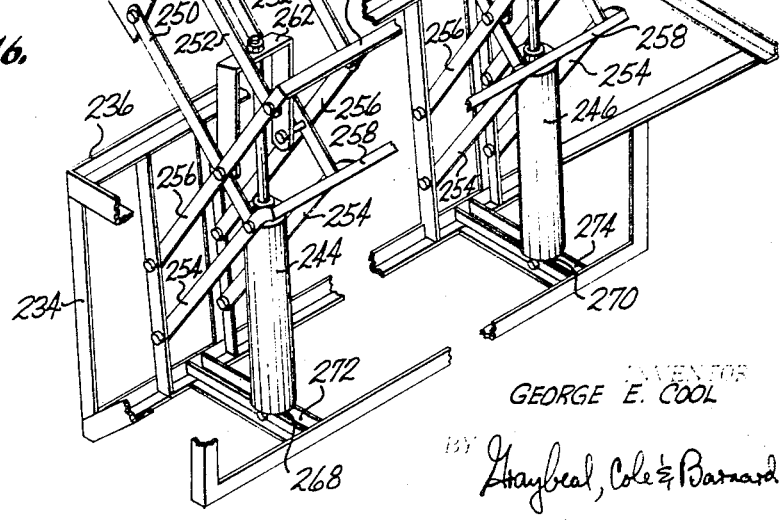

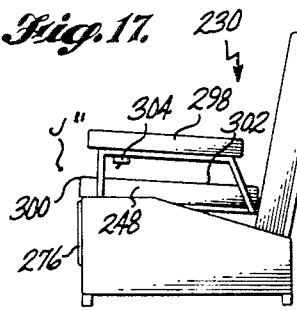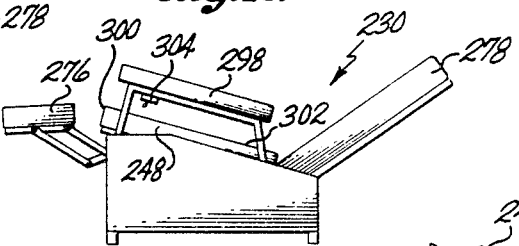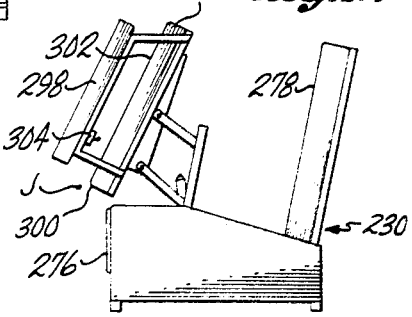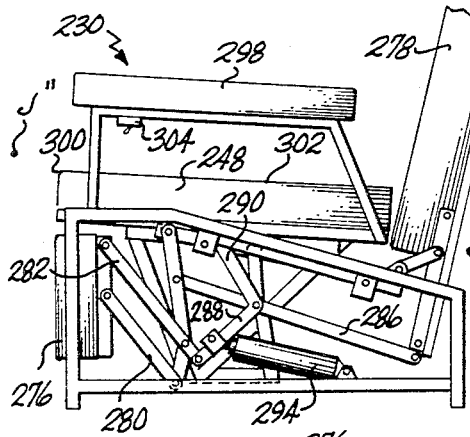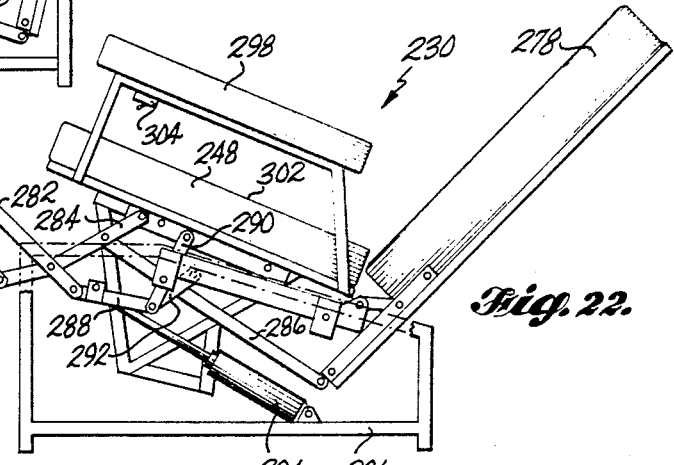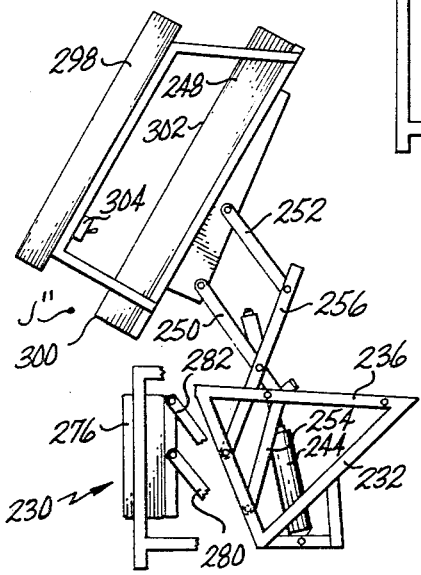

3,473,174
SEAT CONSTRUCTION
George E. Cool, 1532 17th Ave. E.,
Seattle, Wash. 98105
Filed Aug. 19, 1966, Ser. No. 573,660
Int. Cl. A47k 3/12
U.S. Cl. 4—251                                        14 Claims

ABSTRACT OF THE DISCLOSURE

A power tilted seat construction for use by invalids and the like, and involving an upstanding frame member with side sections at either side of the seat, with interconnection means and associated power operable means between the frame member and the seat for selectively pivoting the seat upwardly and forwardly through a trajectory moving about an axis approximating the axis of articulation of the knee joints of the user when in normal seated position on the seat. Features include generally vertically acting hydraulic power means for moving the seat, and toilet seat adaptations wherein both the seat and the frame member are pivotally mounted to the rear of the seat to facilitate cleaning of the toilet bowl.

---

The present invention relates to seat constructions, and more particularly to an improved seat construction of the type having a power-operable seat member for automatically raising a user from a seated position to a standing position, and lowering him from a standing position to a seated position.

Many types of seating structures are designed so that the seating surfaces are disposed below the knee height of the average adult user. For example, the seating surface on the conventional toilet is well beneath the knee height of the average adult, as is the seating surface on many so-called "easy" chairs. Each of these types of seating structures requires the user thereof to pass through an uncomfortable "squatting" position when being seated or when rising to a standing position. Movement to and from such position is particularly difficult, and an often impossible task for a partially or totally incapacitated person.

This circumstance may best be appreciated by considering the problem of an invalid or semi-invalid attempting to use a conventional toilet. Because of his difficulty or total inability to seat himself on and rise from the relatively low toilet seat without falling, he must enlist the help of one or more persons, depending upon his size and the extent of his disability. This not only creates an embarrassing situation, but also inconveniences those who must attend the invalid. Where the invalid is in a hopsital or convalescent home, one or more nurses or attendants must take time out from their other duties to assist the invalid; and where the invalid is at home, other members of the household must do the same.

Similar considerations are present in seating an invalid in a conventional "easy" chair, although the embarrassment and necessity problems are not as acute.

In an effort to overcome the aforementioned problems, several different types of seating structures have been devised wherein the seating surface is movable to aid the user in moving between a seated and standing position. For example, Stryker U.S. Patent 3,158,389 shows a toilet seat construction which includes a base member adapted to rest on a conventional toilet bowl, and a toilet seat pivotally connected thereto, whereby the toilet seat can be pivoted upwardly and forwardly relative to the base member. Torsion springs are provided between the base member and the toilet seat for biasing the seat uprightly. When a user sits on the toilet seat, his weight forces the seat down to a horizontal seated position on the base member, and latch means are provided to hold the seat in this position. In order to rise from a seated position to a standing position the user leans forwardly and upwardly, the torsion springs providing only partial assistance. This is a difficult task for many invalids, and an impossible one for others.

A second disadvantage of the Stryker construction is that the springs selected will provide less assistance to a heavy person than a light one. If the springs employed are selected for a user of average weight, they may not provide adequate assistance in helping a heavy user to rise to a standing position; and the toilet seat may not move down to the horizontal, seated position under the weight of a light user. Thus, the Stryker construction is not adapted for efficient use by a plurality of persons of various weights.

Another disadvantage associated with the Stryker seat construction is that the axis about which the toilet seat pivots is below the knee height of the average user, presuming the toilet bowl shown in the Stryker patent to be of conventional size. The spring-biased toilet seat thus functions to urge the user toward an unnatural "semi-standing" position. This movement of the toilet seat urges the user's body through unnatural movements; that is, movements which the user would not go through if he were able to raise himself to a standing position.

Still another disadvantage associated with Stryker's toilet seat construction is that it impedes normal use of the toilet by non-invalids, and hence should be removed from the toilet bowl when a non-invalid wishes to use the toilet. The Stryker construction also must be removed for cleaning the toilet bowl, since it hinders that operation.

Other seat constructions, such as those shown in U.S. Patents 2,641,305 and 3,218,102 have been designed with power operable means for pivoting the seat member upwardly and forwardly. However, in each of the seat constructions, shown by these patents the pivot axis of the seat member is below the knee height of the average adult user. Consequently, each of these types of seat constructions will only raise the user to a semi-standing position, and subjects the user to the same unnatural body pressures discussed above. Moreover, there is no apparent way to adapt these constructions for use with a toilet.

Each of the wheelchair constructions shown in U.S. Patents 2,053,852 and 3,023,048 is provided with power operable means for pivoting the seat member upwardly and forwardly. In wheelchairs, however, the seat members are normally located at about the knee height of the average adult user. Hence, these constructions do not resolve the aforementioned problems associated with seating structures having their seating surfaces disposed below the knee height of the average user, such as conventional toilet seats and "easy" chairs.

Heyl et al. U.S. Patent 3,138,402 shows an invalid chair provided with suitable linkage and power operable means for raising the seat member upwardly toward the knee height of the average adult user. However, the Heyl et al. construction is not adapted to move the seat member to a substantially vertical position, and the user must slide himself from the seat to a standing position after moving the seat to its uppermost position. This is a difficult and often dangerous task for severly handicapped persons who might fall to the floor when trying to slide from the seat member. Nor is the Heyl et al. seat linkage designed to raise the seat through a path approximately the natural path of movement of the upper legs and thighs of an individual as he rises and seats himself. Thus, the Heyl et al. seat will urge the user's body through unnatural movements as it is raised and lowered. Moreover, the Heyl et al. structure is not adapted for use with a toilet seat.

It is a basic object of the present invention to overcome the aforementioned disadvantages associated with the prior art seat constructions, and to provide in their stead an improved seat construction adapted to automatically raise and lower a user between a normal standing position and a seated position.

A more specific object of the present invention is to provide an improved seat construction wherein the seat member may be selectively moved automatically between a substantially horizontal, seated position wherein the seating surface is disposed between the knee height of the average adult user, and a substantially vertical, standing position wherein the forward edge of the seating surface is disposed at the approximate knee height of the average adult user.

Another object of the present invention is to provide a seat construction which urges the user's body through natural movements while raising him to a standing position or lowering him to a seated position; that is, movements which the user himself would execute if he were physically able to do so.

Another object of this invention is to provide an improved seat construction of the type described in the preceding paragraph wherein the seat is adapted to be stopped at any position between the seated and standing positions, to accommodate users who cannot assume a fully seated or fully standing position, for example.

Still another object of the present invention is to provide an improved seat construction of the type described in the preceding paragraph which is adapted to fit on conventional toilet bowls.

Yet another object of the present invention is to provide an improved toilet seat construction of the type described in the two preceding paragraphs which does not interfere with normal use or with cleaning of the toilet bowl.

The foregoing and other objects, features and advantages of the invention will become apparent from the following description of certain typical embodiments of the invention, as illustrated in the accompanying drawings, wherein like numerals refer to like parts, and wherein:

FIG. 1 is a perspective view of a toilet seat assembly constructed in accordance with the principles of the present invention;

FIG. 2 is a side elevational view of the toilet seat construction shown in FIG. 1 with the seat member in the horizontal, seated position;

FIG. 3 is a front elevational view of the toilet seat construction shown in FIGS. 1 and 2;

FIG. 4 is a side elevational view of the toilet seat construction shown in FIGS. 1–3 with the seat member raised to its substantially vertical, standing position;

FIG. 5 is a front elevational view of the toilet seat assembly in the attitude thereof shown in FIG. 4;

FIG. 6 is a side elevational view of the toilet seat construction of FIGS. 1–5, with the entire construction shown in the lifted position for cleaning the toilet bowl;

FIG. 7 is a front elevation view of the toilet seat construction shown in FIG. 6;

FIG. 7A is a schematic illustration of one specific arrangement of hydraulic and electrical circuitry employed in the power operable seat constructions disclosed herein;

FIG. 8 is a perspective view of a modified form of a toilet seat assembly constructed in accordance with the teachings of the present invention;

FIG. 9 is a side elevational view showing the toilet seat construction of FIG. 8 with the seat member in the horizontal, seated position;

FIG. 10 is a front elevational view of the toilet seat construction shown in FIG. 9;

FIG. 11 is a side elevational view of the toilet seat construction shown in FIGS. 8–10, with the seat member raised to the substantially vertical, standing position;

FIG. 12 is a front elevational view of the toilet seat construction shown in FIG. 11;

FIG. 13 is a side elevational view of the toilet seat construction of FIGS. 8–12, with the entire construction shown in the lifted position for cleaning the toilet bowl;

FIG. 14 is a front elevational view of the toilet seat construction shown in FIG. 13;

FIG. 15 is a perspective view of another embodiment of a seat raising and lowering structure constructed in accordance with the present invention and adapted to be incorporated in an "easy" chair;

FIG. 16 is a perspective view of the seat raising and lowering structure of FIG. 15, with the seat supporting members shown in their substantially vertical, standing position;

FIG. 17 is a side elevational view of an "easy" chair in which is incorporated the seat raising and lowering structure of FIGS. 15 and 16;

FIG. 18 is a side elevational view of the "easy" chair of FIG. 17 with the foot rest and back portions of the chair shown in their extended positions;

FIG. 19 is a side elevational view of the "easy" chair of FIGS. 17 and 18 with the seat shown in its substantially vertical, standing position;

FIG. 20 is a partial side elevational view of the "easy" chair of FIGS. 18 and 19, with the seat shown in its substantially vertical, standing position, and with portions broken away to reveal the linkage network of the seat raising and lowering structure;

FIG. 21 is a partial side elevational view of the "easy" chair of FIGS. 18–20, with the foot rest and back portion in their retracted positions, and with portions broken away to reveal the linkage arrangement between the foot rest and back portion; and FIG. 22 is a partial side elevational view of the "easy" chair of FIGS. 17–21 with the foot rest and back portion shown in their extended positions, and with portions broken away to reveal the linkage arrangement between the foot rest and back portion.

Referring now to specific constructions shown in the drawings, FIGS. 1–7 illustrate an improved toilet seat construction 30 comprising a frame member 32 having laterally spaced upstanding side sections 34, 36 adapted to be disposed on either side of a conventional toilet bowl 38. The frame member side sections 34 and 36 include rear portions 40, 42 which are connected to one another by a transversely extended cross bar 44. The cross bar 44 is adapted to be pivotally connected to the rear portion 46 of the toilet bowl 38 by suitable connection means 48, whereby the entire seat construction 30 can be lifted upwardly and rearwardly to facilitate cleaning of the toilet bowl 38, as shown in FIGS. 6 and 7. As best shown in FIGS. 1, 2, 4 and 6, the connection means 48, 48 are suitably in the form of ring members having downwardly extending threaded portions adapted to fit through holes normally provided in the rear portion of a conventional toilet bowl for receiving the toilet seat securing means. Thus, the frame member 32 may be conveniently attached to a conventional toilet bowl.

A seat supporting member 58 is pivotally connected at its forward ends 54, 56 to the upper forward ends 50, 52 of the frame member side sections 34, 36 by interconnection means which include pivot pins 76, 78. The pivot pins are located at approximately the height of the axis of articulation J (FIGS. 1, 4 and 5) of the knee joints of the average adult user, and define a pivot axis about which the seat supporting member 58 may pivot. Where it is contemplated that a relatively large number of persons of various heights will use the seat construction, the pivot pins 76, 78 should be located at about eighteen inches above the floor surface. The seat supporting member 58 comprises a transversely extending rear portion 60; forwardly extending side portions 62, 64 which include means defining hand or arm rails 66, 68; and a pair of flat plate portions 69, 71 which are connected to the side portions 62, 64 and extend inwardly therefrom to overlie the top surface 70 of the toilet bowl 38.

A toilet seat 72, which suitably is conventional per se, is pivotally connected at its rear portion 74 to the transversely extending rear portion 60 of the seat supporting member 58, whereby the toilet seat is pivotally movable upwardly and rearwardly relative to the seat supporting member 58 (see the phantom line position of the toilet seat 72 in FIGS. 2 and 3).

The interconnection means between the frame member 32 and the seat supporting member 58 further include power operable means in the form of a pair of hydraulic cylinder assemblies 84, 86 disposed between the frame member side sections 34, 36 and the flat plate portions 69, 71 of the seat supporting member for raising and lowering the latter between the horizontal, seated position (FIGS. 1–3) and the vertical, standing position (FIGS. 4 and 5). The bottom portions 88, 90 of the hydraulic units 84, 86 are pivotally connected to floor contacting feet members 92, 94 upon which the frame member side sections 34, 36 are supported, and the upper portions 96, 98 of the hydraulic units are pivotally connected to downwardly extending flanges 100, 102 on the seat supporting member flat plate portions 69, 71.

As shown in FIG. 7A, a conventional hydraulic pump 106 driven by a reversible motor 108 and hydraulic fluid supply means 110 are connected to the hydraulic units 84, 86 for extending and retracting the units to raise and lower the seat supporting member 58 and toilet seat 72. The reversible electric motor 108 is operated by means of a conventional momentarily on type double pole-double throw switch 104 electrically connected between the motor and power line 112 and physically attached to the seat supporting member 58 in the vicinity of one of the hand rails 66 or 68 so that the switch 104 can be manipulated without the user having to lose his grasp on the adjacent hand rail 66. The remaining portions of the circuitry shown in FIG. 7A pertain to the embodiments shown in FIGS. 8–22 and will be discussed hereinafter in connection with those figures.

The trajectory through which the toilet seat 72 moves when the hydraulic units 84, 86 are extended and retracted is conveniently describable by referring to the imaginary axis J (FIGS. 1, 4 and 5) which substantially coincides with the axis of articulation of the knee joints of the average user. As noted above, the toilet seat construction 30 is designed so that the pivot pins 76, 78 are at approximately the height of the axis of articulation of the knee joints of the average adult. Thus, the pivot axis of the seat supporting member 58 and the attached toilet seat 72, which is defined by the pivot pins 76, 78, is substantially coincidental with the imaginary axis J. When the hydraulic units 84, 86 are extended they cause the seat supporting member 58 and the toilet seat 72 to move upwardly and forwardly through an arcuate path about the imaginary axis J until the toilet seat reaches the substantially vertical, standing position shown in FIGS. 4 and 5. In the standing position the rear portion 74 thereof is uppermost and its forward edge 80, 80 is disposed upwardly and forwardly of its position when the toilet seat is in the seated position. The distance which the forward edge 80, 80 moves upwardly is approximately equal to the distance which it moves forwardly. When the hydraulic units 84, 86 are retracted the seat supporting member 58 and the toilet seat 72 are moved rearwardly and downwardly until the toilet seat is in the horizontal, seated position (FIGS. 1–3). As the toilet seat 72 is carried through its arcuate path when being raised or lowered by the hydraulic units 84, 86, the seat is maintained in an attitude extending substantially radially of the imaginary axis J. Since the axis J is defined by the axis of articulation of the knee joints of the user, the arcuate path of movement of the seating surface is substantially coincidental with the natural path which the upper legs and thighs of the user would travel through if he were able to rise and seat himself. Thus, the toilet seat urges the user's body through natural movements as it raises him to a standing position or lowers him to a seated position.

In operation, when an invalid wishes to use the toilet seat construction 30 shown in FIGS. 1–7, he or his attendant first operates the switch 104 to extend the hydraulic units 84, 86 and raise the seat supporting member 58 to the substantially vertical, standing position shown in FIGS. 4 and 5. The flat plate portions 69 and 71 of the seat supporting member 58 which underlie the toilet seat 72 carry the toilet seat to the standing position of FIGS. 4 and 5 along with the seat supporting member. The user then backs into the toilet seat until his upper thighs contact the same. He then may lean back on the seat and the switch 104 can be operated to retract the hydraulic units 84, 86 and lower the seat supporting member 58 and the toilet seat 72 to the substantially horizontal, seated position shown in FIGS. 1–3. Where the user is a totally incapacitated individual, his attendant may strap him into the toilet seat by means of suitable seat belt means (not shown), suitably connected to the seat supporting member 58 for preventing the user from sliding off the seat. If the user is unable to assume a fully seated or fully standing position, which may be the case if the user is arthritic or in a cast, the switch 104 can be controlled to halt extension or retraction of the hydraulic units 84, 86 and to maintain the toilet seat at any desired position which will accommodate the user.

When the user wishes to be raised from a seated position to a standing position, he or his attendant simply operates the switch 104 to again raise the seat supporting member 58 and the toilet seat 72 upwardly and forwardly to the standing position. As noted above, the trajectory of the toilet seat 72 as it moves the user between the seated and standing positions is in accordance with the natural body movement of the user.

The toilet seat construction 30 described above does not interfere with use of the toilet by the non-invalid user; nor does it hinder cleaning of the toilet bowl. Since the toilet seat 72 is pivotally connected to the rear portion 60 of the seat supporting member 58, the toilet seat may be lifted upwardly and rearwardly relative to the seat supporting member 58 and the toilet bowl to the phantom line position shown in FIGS. 2 and 3. As shown in FIGS. 6 and 7, the entire seat construction 30, including the frame member 32, can be raised upwardly and rearwardly about the axis of cross bar 44 to facilitate cleaning the toilet bowl.

The toilet seat construction 130 shown in FIGS. 8–14, is quite similar to the embodiment of FIGS. 1–7, differing only with regard to the interconnection means between the toilet seat 172 and the frame member 132.

Referring now to FIGS. 8–14, the modified seat construction 130 is seen to comprise a frame member 132 having laterally spaced upstanding side sections 134, 136 adapted to be positioned on either side of a conventional toilet bowl 138. The frame member 132 further includes a cross bar 144 integrally connected to the rear portions 140, 142 of the frame member side sections 134, 136. The cross bar 144 is pivotally connected to the rear portion 146 of the toilet bowl 138 by suitable connections means 148, 148. Like the connections means 48, 48 of the toilet seat construction 30 shown in FIGS. 1–7, the connection means 148, 148 are in the form of rings having downwardly extending threaded portions adapted to fit through the holes provided in the rear portion of a conventional toilet bowl. Thus, the frame member 132 may be easily connected to a conventional toilet bowl.

The seat construction 130 further includes a seat supporting member 158 comprising a transversely extending rear portion 160 and two forwardly extending side portions 162, 164. The seat supporting member side portions 162, 164 include a pair of hand rails 166, 168 and a pair of flat plate members 169, 171 which extend inwardly over the top surface 170 of the toilet bowl 138 and support the bottom surface of the toilet seat 172. The toilet seat rear portion 174 is pivotally connected to the rear portion 160 of the seat supporting member 158, whereby the toilet seat can be lifted upwardly and rearwardly relative to the toilet bowl 138 and the seat supporting member 158 (see the phantom line position of the toilet seat in FIGS. 9 and 10).

As best shown in FIGS. 9, 11 and 13, the seat supporting member 158 is connected to the frame member 132 by interconnection means in the form of a network of links which extend between the frame member side sections 134, 136 and the downwardly projecting flanges 200, 202 of the flat plate members 169, 171. The linkage arrangement between the side section 134 and the flange 200 includes first and second seat links 150, 152 having inner ends pivotally connected to the flange 200, and first and second frame links 154, 156 having inner ends pivotally connected to the frame member side section 134. The outer ends of the first and second seat links 150, 152 are pivotally connected to the outer ends of the first and second frame links 154, 156, respectively, and intermediate portions of the first seat link 150 and the second frame link 156 are pivotally connected to one another. An identical linkage arrangement is provided between the frame member side section 136 and the flange 202 of the flat plate member 171.

As best shown in FIGS. 9–12, the linkage arrangement between the seat supporting member 158 and the frame member 132 permits movement of the frame member and the attached toilet seat 172 between a horizontal, seated position (FIGS. 8–10), and a substantially vertical, standing position (FIGS. 11 and 12). Power operable means in the form of a pair of hydraulic cylinder assemblies 184, 186 are provided for selectively moving the seat supporting member 158 and the toilet seat 172 between the seated and standing positions. The bottom portions 188, 190 of the hydraulic units 184, 186 are pivotally connected to the feet member 192, 194 of the frame member side sections 134, 136, and the upper portions 196, 198 of the hydraulic units are pivotally connected to the second frame links 156, 156.

The same arrangement of hydraulic and electrical circuitry shown in FIG. 7A and discussed in connection with the embodiment of FIGS. 1–7 may be employed for raising and lowering the toilet seat 172 of the construction 130. Referring to FIG. 7A, a conventional reversible hydraulic pump 206 driven by a reversible electric motor 208 and hydraulic fluid supply means 210 are provided for extending and retracting the hydraulic units 184, 186. A conventional, momentary-on type double pole, double throw switch 204 electrically connected between the motor 208 and power line 212 and physically attached to one of the hand rails 166 or 168 is provided for operating the motor to extend and retract the hydraulic units.

The trajectory through which the toilet seat 172 moves when the hydraulic units 184, 186 are extended and retracted is conveniently describable by referring to an imaginary axis J' (FIGS. 8, 11 and 12) which is defined by the axis of articulation of the knee joints of the average adult user. The linkage arrangement between the seat supporting member 158 and the frame member 132 is designed so that the pivot axis about which the seat supporting member and the attached toilet seat 172 pivot when the hydraulic units 184, 186 are extended and retracted, is substantially coincidental with the imaginary axis J'. Although movement of the seat supporting member 158 and the toilet seat 172 is not about a precisely fixed pivot axis (as in the case of the FIGS. 1–7 embodiment), such movement is nevertheless centered at substantially the same horizontal level throughout the arcuate movement of the seat supporting member and the toilet set. Thus, as the hydraulic unit 184, 186 are extended and retracted, the seat supporting member 158 and the seat 172 travel through an arcuate path and are maintained at an attitude extending substantially radially of the axis J'. Since the axis J' is defined by the axis of articulation of the knee joints of the user, the arcuate path of movement of the seating surface 172 is substantially coincidental with the natural path which the upper legs and thighs of the user would move through if the user were able to rise and seat himself. Thus, the movement of the seat 172 acts to urge the user's body through natural movements as it raises him to a standing position and lowers him to a seated position.

As best shown in FIGS. 11 and 12, when the seat 172 is in the substantially vertical, standing position, the rear portion 174 thereof is uppermost, and the forward edge 180, 180 is disposed upwardly and forwardly of its position when the toilet seat is in the horizontal, seated position (FIGS. 8–10).

Operation of the toilet seat construction 130 in FIGS. 8–14 is substantially identical to the operation of the toilet seat 30 described above relative to the embodiment of the invention FIGS. 1–7. When an invalid wishes to use the toilet, he or his attendant operates the switch 204 to extend the hydraulic units 184, 186 and raise the seat supporting member 158 and toilet seat 172 to the substantially vertical, standing position shown in FIGS. 11 and 12. The user then backs into the toilet seat 172 until his thighs are in contact with it, and switch 204 is then actuated to retract the hydraulic units 184, 186 and lower the seat supporting member 158 and the toilet seat 172 to the horizontal, seated position shown in FIGS. 8–10. If the invalid is unable to assume a fully seated or fully standing position, the switch 204 can be turned off before the seat reaches the horizontal position to stop and maintain the seat at any position desired to best accommodate the invalid.

To raise himself to the standing position, switch 204 is again actuated and the hydraulic units 184, 186 will again extend and move the seat supporting member 158 and the toilet seat 172 upwardly and forwardly to the substantially vertical, standing position.

As shown in FIGS. 13 and 14 the frame member 132 of the toilet seat construction 130 is pivotally movable upwardly and rearwardly about the axis of the cross bar 144 to facilitate cleaning of the toilet bowl 138. In addition, the toilet seat 172 is pivotally movable upwardly and rearwardly relative to the toilet bowl 138 and the remainder of the seat construction 130 (as shown by phantom line in FIGS. 9 and 10). Thus, the toilet seat construction shown in FIGS. 8–14, like the toilet seat construction 30 of FIGS. 1–7, does not interfere with normal use of the toilet by a non-invalid; nor will it hamper cleaning of the toilet bowl.

The modified embodiment of the invention shown in FIGS. 15–22 comprises a conventional "easy" chair construction 230, modified to incorporate therewith a seat raising and lowering structure 232 according to the present invention. Referring first to FIGS. 15 and 16, the seat raising and lowering structure 232 comprises a frame member 234, a pair of seat supporting members 238, 240, a link network 242 connecting the seat supporting members to the frame member and power operable means in the form of a pair of hydraulic cylinder assemblies 244, 246 connected between the frame member and the link network for raising and lowering the seat supporting members. The seat supporting members 238, 240 are adapted to be secured to a seat member, such as the seat 248 (FIGS. 17–22).

The link network 242 comprises four sets of laterally spaced, parallel links, each set being arranged in substantially the same manner as the link sets 150, 152, 154, 156 of the embodiment shown at FIGS. 8–14. As best shown in FIG. 20, each set of links in the network 242 comprises a first seat link 250 having its inner end pivotally connected to one of the seat supporting members 238 or 240, a second seat link 252 having its inner end pivotally connected to one of the seat supporting members, a first frame link 254 having its inner end connected to the frame member 234 and its outer end connected to the outer end of the first seat link 250, and a second frame link 250, and a second frame link 256 having its inner end connected to the frame member 234 and its outer end connected to the outer end of the second seat link 252. The first seat link 250 and the second frame link 256 are pivotally connected to one another intermediate their inner and outer end portions. The four first frame links 254, 254, 254, 254 have their outer ends connected to a common cross bar 258, and the outer ends of the four second frame links 256, 256, 256 256 are similarly connected by a cross bar 260.

The upper ends of the hydraulic units 244, 246, are pivotally connected to the link network 242 by means of U-flanges 262, 264, each of which has its side arms pivotally connected to the pivot pins 266, 266 which connect the intermediate portions of the first seat links 250, 250 and the second frame links 256, 256. The bottom portions 268, 270 of the hydraulic units 244, 246 are pivotally connected to the feet portions 272, 274 of the frame member 234.

As best shown in FIGS. 15, 16, 17, 19 and 20, the hydraulic units 244, 246 are adapted to be extended to raise the seat supporting members 238, 240 and the attached seat 248 to a substantially vertical, standing positions (FIGS. 16, 19 and 20), and to be retracted to lower the seat supporting members and the attached seat to a horizontal, seated position (FIGS. 15 and 17). Like the interconnection means between the seat supporting members and the frame members in the seat constructions 30 and 130 of FIGS. 1–7 and FIGS. 8–14, the link network 242 between the seat supporting members 238, 240 and the frame member 234 of the "easy" chair construction 230 is designed to raise and lower the seat 248 through an arcuate path about a pivot axis which substantially coincides with the imaginary axis J" (FIGS. 17, 19, 20 and 21). This axis J" is substantially coincident with the axis of articulation of the knee joints of the user when he is in a normal seated position on the seat 248. Thus, as the seat 248 is carried through its arcuate path when being raised or lowered by power units 244, 246, the seat maintains an attitude extending substantially radially of the imaginary axis J". In view of such coincidence, the arcuate path of movement of the seat is substantially coincidental with the natural path which the upper legs and thighs of the user would move through if he were able to rise and seat himself. Thus, the seat 248 acts to urge the user's body through natural movements as it raises him to a standing position and lowers him to a seated position.

It should be noted that although movement of the seat 248 is not about a precisely fixed pivot axis, such movement is substantially centered at substantially the same level throughout the arcuate movement of the seat, and that such movement is characterized by the seat surface 302 remaining substantially radial of the axis J".

As shown in FIGS. 17–22, the "easy" chair 230 has an extendable foot rest 276 and a reclining back portion 278, with the foot rest 276 connected to the back portion 278 by a series of links 280, 282, 284, 286, 288, 290, 292, so that the foot rest is urged to its extended position when the back portions 278 is urged to its reclining position (FIG. 22). Power operable means, such as a hydraulic cylinder assembly 294, may be employed for automatically extending and retracting the foot rest 276 and the reclining back portion 278. One end of the hydraulic unit 294 is pivotally connected to the link 288, and the other end is pivotally connected to the chair frame 296. Suitable fluid supply means 320, motor means 322, pump means 324, and switch means 326 (FIG. 7A) are provided for selectively extending and retracting the hydraulic unit 294. Like the switch 304 for operating the hydraulic units 244, 246, the switch 326 for the hydraulic unit 294 may be conveniently located in the vicinity of one of the arm rests 298. As will be observed the seat raising and lowering structure 232 does not interfere with normal use of the extendible foot rest 276 and the reclining back portion 278 of the chair 230.

Referring again to FIG. 7A, it is seen that the same arrangement of hydraulic and electrical circuitry employed to extend and retract the hydraulic units of the toilet seat constructions 30 and 130 of FIGS. 1–7 and 8–14 is employed to extend and retract the hydraulic units 244, 246 to raise and lower the seat 248 of the "easy" chair 230. Thus, a conventional, reversible hydraulic pump 306 driven by a reversible electric motor 308 and hydraulic fluid supply means 310 are provided for extending and retracting the hydraulic units 244, 246. A conventional momentary-on type double pole-double throw switch 304 electrically connected between the motor 308 and power line 312 and physically attached to one of the hand rails 298, 298 is provided for operating the motor to extend and retract the hydraulic units.

A conventional reversible hydraulic pump 324 driven by a reversible electric motor 322 and hydraulic fluid supply means 320 are provided for extending the hydraulic cylinder 294 to extend the foot rest 276 and recline the back portions 278 of the "easy" chair 230. A conventional momentary-on type double pole-double throw type switch 326 electrically connected between the motor 322 and the power line 312 and physically connected to one of the hand rails 298, 298 is provided for operating the motor to extend and retract the hydraulic unit 294.

In operation, when a user wishes to be seated in the chair 230 he or his attendant operates the switch 304 to extend the hydraulic units 244, 246 and raise the seat supporting member 238, 240, and the seat 248 to the substantially vertical, standing position (FIGS. 16, 19 and 20). In the standing position the rear edge of the seating surface 302 of the seat 248 is uppermost and the forward edge 300 is disposed upwardly and forwardly of its position when the seat member 248 is in its substantially horizontal, seated position (FIGS. 17 and 21). The distance which the forward edge 300, moves upwardly is approximately equal to the distance which it moves forwardly.

With the seat 248 in the standing position, the user backs against the seating surface 302. Switch 304 is then operated to retract the hydraulic units 244, 246 and move the seat 248 rearwardly and downwardly to the horizontal, seated position. After the seat 248 has reached the seated position, the user can operate the switch to extend the foot rest 276 and recline the back portion 278 of the chair 230, if desired.

When the user wishes to rise, he simply actuates the switch raising the back portion 278 and then the switch 304 to again extend the hydraulic units 244, 246 and raise the seat 248 upwardly and forwardly to the standing position.

While the invention has been shown and described with reference to preferred embodiments thereof, it will be understood by those skilled in the art that various changes in form and details may be made therein without departing from the spirit and scope of the invention. For example, while the invention has been specifically shown and discussed above in conjunction with a toilet seat and with a chair of the reclining type, it will be readily understood that the features of the invention are equally applicable to virtually any other seating construction, such as a non-reclining chair or bench, simply by way of further example. Similarly, while the switch means for operating the hydraulic cylinders to raise and lower the seating surfaces have been shown herein physically attached to the hand rails, and such arrangement is believed preferable in most instances, such switch means can be physically located anywhere on the seat constructions, or in the vicinity of the seat, as by being wall mounted, or floor mounted for foot control. It is also to be recognized that equivalent power operable means, such as a rack and pinion assemblies or a rotatable screw shaft arrangements can be employed as the power operable assemblies in place of the hydraulic cylinder means shown.

Another contemplated variation of this invention is that either of the toilet seat constructions 30 or 130 can be of a mobile nature. For example, the seat construction can be placed on wheels so that an invalid could be wheeled to the toilet and use the toilet without having to be moved onto the toilet from a wheelchair. In such a case, for example, the toilet seat carrier by the wheeled construction would be movable into a position over a conventional toilet bowl.

What is claimed is:
1. A seat construction comprising:
 (a) a toilet bowl having a substantially horizontal upper surface adapted to support a toilet seat, said toilet bowl including front, rear and two side portions;
 (b) an upstanding frame member comprising a pair of spaced, upstanding side sections disposed on either side of said toilet bowl, each of said side sections having front and rear portions;
 (c) a seat supporting member;
 (d) a seat member carried by said seat supporting member, said seat member including a substantially planar seating surface having a front edge and a rear edge;
 (e) structural interconnection means disposed between said frame member and said seat supporting member and including laterally spaced structural elements providing lateral stability between said frame member and said seat supporting member, such structural elements also including interconnected members configured to enable the seat supporting member to be arcuately raised and lowered to and from a seated position where said seating surface is in a substantially horizontal position and a standing position where said seating surface is in a substantially vertical position with said rear edge thereof uppermost and with said front edge thereof moved upwardly and forwardly from its lowered position, such arcuate movement occurring through a tajectory wherein said seating surface is maintained in an attitude extending substantially radially of the position of the axis of articulation of the knee joints of the user when in normal seated position on said seating surface;
 (f) power operable supporting means, constituting a part of said interconnection means, by which said seat member and its seating surface are arcuately movable between such substantially horizontal and substantially vertical positions and maintainable at any desired position therebetween; and
 (g) means for selectively operating said power operable support means;
said frame member further including a crossbar extending between and connecting said rear portions of said side sections; and further including means pivotally connecting said crossbar to the rear portion of said toilet bowl, whereby said frame member may be pivoted upwardly about the axis of said crossbar to facilitate cleaning said toilet bowl.

2. A seat construction comprising:
 (a) a toilet bowl having a substantially horizontal upper surface adapted to support a toilet seat, said toilet bowl including front, rear and two side portions;
 (b) an upstanding frame member comprising a pair of spaced, upstanding side sections disposed on either side of said toilet bowl, each of said side sections having front and rear portions;
 (c) a seat supporting member including a rear portion and two forwardly extending side portions, said two side portions including means defining hand rails;
 (d) a seat member carried by said seat supporting member, said seat member comprising a toilet seat having a front edge and a rear edge;
 (e) means pivotally connecting said rear portion of said toilet seat to said rear portion of said seat supporting member, whereby said toilet seat is pivotally movable upwardly and rearwardly relative to said seat supporting member;
 (f) structural interconnection means disposed between said frame member and said seat supporting member and including laterally spaced structural elements providing lateral stability between said frame member and said seat supporting member, such structural elements also including interconnected members configured to enable the seat supporting member to be arcuately raised and lowered to and from a seat position where said seating surface is in a substantially horizontal position and a standing position where said seating surface is in a substantially vertical position with said rear edge thereof uppermost and with said front edge thereof moved upwardly and forwardly from its lowered position, such arcuate movement occurring through a trajectory wherein said seating surface is maintained in an attitude extending substantially radially of the position of the axis of articulation of the knee joints of the user when in normal seated position on said seating surface;
 (g) generally vertically acting power operable supporting means, disposed generally laterally of said toilet seat and constituting a part of said interconnection means, by which said seat member and its seating surface are arcuately movable between such substantially horizontal and substantially vertical positions and maintainable at any desired position therebetween; and
 (h) means for selectively operating said power operable support means.

3. A seat construction comprising:
 (a) a toilet bowl having a substantially horizontal upper surface adapted to support a toilet seat, said toilet bowl including front, rear and two side portions;
 (b) an upstanding frame member comprising a pair of spaced, upstanding side sections disposed on either side of said toilet bowl, each of said side sections having front and rear portions;
 (c) a seat supporting member;
 (d) a seat member carried by said seat supporting member, said seat member including a substantially planar seating surface having a front edge and a rear edge;
 (e) structural interconnection means disposed between said frame member and said seat supporting member and including laterally spaced structural elements providing lateral stability between said frame member and said seat supporting member, such structural elements also including interconnected members configured to enable the seat supporting member to be arcuately raised and lowered to and from a seated position where said seating surface is in a substantially horizontal position and a standing position where said seating surface is in a substantially vertical position with said rear edge thereof uppermost and with said front edge thereof moved upwardly and forwardly from its lowered position, such arcuate movement occurring through a trajectory wherein said seating surface is maintained in an attitude extending substantially radially of the position of the axis of articulation of the knee joints of the user when in normal seated position on said seating surface;

(f) power operable supporting means, constituting a part of said interconnection means, by which said seat member and its seating surface are arcuately movable between such substantially horizontal and substantially vertical positions and maintainable at any desired position therebetween; and (g) means for selectively operating said power operable support means;

said front portions of said frame member side sections terminating in upper forward ends extending upwardly and forwardly of said axis of articulation; said forwardly extending side portions of said seat supporting member terminating in forward ends; and said structural interconnection means disposed between said frame member and said seat supporting member comprising means pivotably connecting said forward ends of said seat supporting member side portions to said upper forward ends of said frame member side sections, whereby said toilet seat and said seat supporting member are pivotally movable upwardly and forwardly about a fixed pivot axis defined by said upper forward ends of said frame member side sections.

4. A seat construction according to claim 3, wherein said power operable means comprises a hydraulic cylinder unit having a lower end pivotably connected to said frame member and an upper end pivotably connected to said seat supporting member.

5. A seat construction comprising:
 (a) an upstanding frame member;
 (b) a seat supporting member;
 (c) a seat member carried by said seat supporting member, said seat member including a substantially planar seating surface having a front edge and a rear edge;
 (d) structural interconnection means disposed between said frame member and said seat supporting member and including laterally spaced structural elements providing lateral stability between said frame member and said seat supporting member, such structural elements also including interconnected members configured to enable the seat supporting member to be arcuately raised and lowered to and from a seated position where said seating surface is in a substantially horizontal position and a standing position where said seating surface is in a substantially vertical position with said rear edge thereof uppermost and with said front edge thereof moved upwardly and forwardly from its lowered position, such arcuate movement occurring through a trajectory wherein said seating surface is maintained in an attitude extending substantially radially of the position of the axis of articulation of the knee joints of the user when in normal seated position on said seating surface, said structural interconnection means disposed between said frame member and said seat supporting member comprising a first seat link having an inner end pivotably connected to said seat supporting member, and an outer end, and a first frame link having an inner end pivotably connected to said frame member, and an outer end pivotably connected to said outer end of said first seat link;
 (e) a pair of hydraulic, generally vertically acting power operable supporting means, disposed generally laterally of said seat member and constituting a part of said interconnection means, by which said seat member and its seating surface are arcuately movable between such substantially horizontal and substantially vertical positions and stably maintainable at any desired position therebetween; and
 (f) means for selectively operating said hydraulic, power operable support means.

6. A seat construction according to claim 5, wherein said first frame link further includes an intermediate portion between said inner and outer ends thereof; and further comprising: a second seat link having an inner end pivotably connected to said seat supporting member, an intermediate portion, and an outer end; a second frame link having an inner end pivotably connected to said frame member and an outer end pivotably connected to said outer end of said second seat link; and means pivotably connecting said intermediate portion of said first frame link to said intermediate portion of said second seat link.

7. A seat construction according to claim 5, wherein said power operable means comprises a hydraulic cylinder unit having a lower end pivotably connected to said frame member and an upper end pivotably connected to said first frame link between said inner and outer ends thereof.

8. A seat construction according to claim 6, wherein said power operable means comprises a hydraulic cylinder assembly having a lower end pivotably connected to said frame member and an upper end pivotably connected to said means pivotably connecting said intermediate portions of said first frame link and said second seat link.

9. A toilet seat construction for use in combination with a toilet bowl having an upper surface, a forward portion, a rear portion and two side portions; said toilet seat construction comprising an upstanding frame member including a pair of laterally spaced upstanding side sections adapted to be disposed on either side of said toilet bowl adjacent to said two toilet bowl side portions; a toilet seat adapted to rest on said upper surface of said toilet bowl; and interconnection means and associated power operable means disposed between said frame member and said toilet seat for selectively pivoting said toilet seat upwardly and forwardly relative to said toilet bowl and said free member; each of said frame member side sections including a rear portion, said frame member further including a crossbar extending between and connecting said rear portions of said frame member side sections, and said toilet seat construction further comprising means for pivotally connecting said frame member crossbar to said rear portion of said toilet bowl, whereby said toilet seat is pivotally movable upwardly and rearwardly relative to said toilet bowl to facilitate cleaning said toilet bowl.

10. A toilet seat construction for use in combination with a toilet bowl having an upper surface, a forward portion, a rear portion and two side portions; said toilet seat construction comprising an upstanding frame member including a pair of laterally spaced upstanding side sections adapted to be disposed on either side of said toilet bowl adjacent to said two toilet bowl side portions; a toilet seat adapted to rest on said upper surface of said toilet bowl; and interconnection means and associated power operable means disposed between said frame member and said toilet seat for selectively pivoting said toilet seat upwardly and forwardly relative to said toilet bowl and said frame member; said toilet seat construction further comprising a seat supporting member having a rear portion and two spaced, forwardly extending side portions; said toilet seat having a rear portion pivotably connected to said rear portion of said seat supporting member; whereby said toilet seat is pivotally movable upwardly and rearwardly relative to said seat supporting member.

11. A toilet seat construction according to claim 10, wherein said side portions of said seat supporting member include means defining handrails.

12. A toilet seat construction according to claim 10, further including switch means mounted on said seat supporting member for selectively actuating said power operable means to pivot said toilet seat and seat supporting member relative to said toilet bowl and said frame member.

13. A toilet seat construction according to claim 10, wherein said power operable means comprises a hydraulic cylinder assembly having a lower end pivotably connected to said frame member and an upper end pivotably connected to said seat supporting member.

14. A toilet seat construction according to claim 10, wherein said power operable means comprises a hydraulic cylinder assembly having a lower end pivotably connected to said frame member and an upper end pivotably connected to said connection means between said frame member and said toilet seat.

References Cited

UNITED STATES PATENTS

| | | | |
|---|---|---|---|
| 1,165,123 | 12/1915 | Rees | 4—251 X |
| 2,598,577 | 5/1952 | Mattison | 4—237 |
| 3,023,048 | 2/1962 | Barton | 297—330 |
| 3,138,402 | 6/1964 | Heyl, et al. | 297—347 X |
| 3,158,398 | 11/1964 | Stryker | 4—237 X |

FOREIGN PATENTS 700,968　12/1964　Canada.

LAVERNE D. GEIGER, Primary Examiner

H. J. GROSS, Assistant Examiner

U.S. Cl. X.R.

297—331, 339